Patented Apr. 14, 1936

2,037,657

UNITED STATES PATENT OFFICE 2,037,657

SPRAY MATERIAL

John W. Roberts, Washington, D. C., dedicated to the free use of the People of the United States No Drawing. Original application September 16, 1932, Serial No. 633,465. Divided and this application December 30, 1935, Serial No. 56,715

1 Claim. (Cl. 167—14)

(Granted under the act of March 3, 1883, as amended April 30, 1928; 370 O. G. 757)

This is a division of my former application filed September 16, 1932, bearing Serial No. 633,465.

This application is made under the act of March 3, 1883, as amended by the act of April 30, 1928, and the invention herein described may be manufactured and used by or for the Government for governmental purposes without the payment to me of any royalty thereon.

I hereby dedicate the invention herein described to the free use of the People of the United States to take effect on the granting of a patent to me.

In my patent (No. 1,791,430), a mixture of zinc sulphate and lime, to which other substances may be added to increase sticking and spreading properties, is described. This fungicide, and bactericide, hereafter designated zinc-lime, is successfully used for protecting plants from the attacks of certain parasitic organisms. It may also be applied to plants as a parasiticide in combination with other parasiticides, such as lead arsenate, nicotine compounds, and mixtures containing elemental sulphur. The advantage to the user is a saving in time and money by applying for different purposes various parasiticides suspended in the same fluid or mixed together dry and applied as a dust. As will hereafter be seen, there is a further unique advantage in the mixture of zinc-lime with other parasiticides.

My new invention pertains to improvements in and novel uses for the zinc-lime spray as follows:

When mixed with zinc-lime, other parasiticides, notably lead arsenate, calcium monosulphide, and mixtures containing elemental sulphur, are rendered notably less liable to cause injury to plants sprayed or dusted than the various combinations, or mixtures used separately or without zinc-lime, without noticeable impairment of their parasiticidal properties.

For example, zinc-lime composed of four pounds of zinc sulphate (white vitriol) and four pounds of hydrated lime (calcium hydroxide) in fifty gallons of water may be made. To this may be added colloidal sulphur, four pounds, and lead arsenate one pound. This mixture may be applied to peach trees in active growing condition without risk of injury, and, when applied at the proper times, will control those pests or parasites for which the separate ingredients are specifically toxic. Without the zinc-lime, the risk of severe injury to foliage, fruit, and young twigs is well known to be great. The zinc-lime frequently causes the leaves to be a deeper green and larger than those of non-treated trees and the fruit is frequently of superior size and color.

Having thus fully described my invention, what I claim for Letters Patent is:

I claim:

A process for rendering injurious arsenical plant sprays non-injurious, which comprises the addition of zinc-lime thereto.

JOHN W. ROBERTS.